United States Patent Office 3,282,508
Patented Nov. 1, 1966

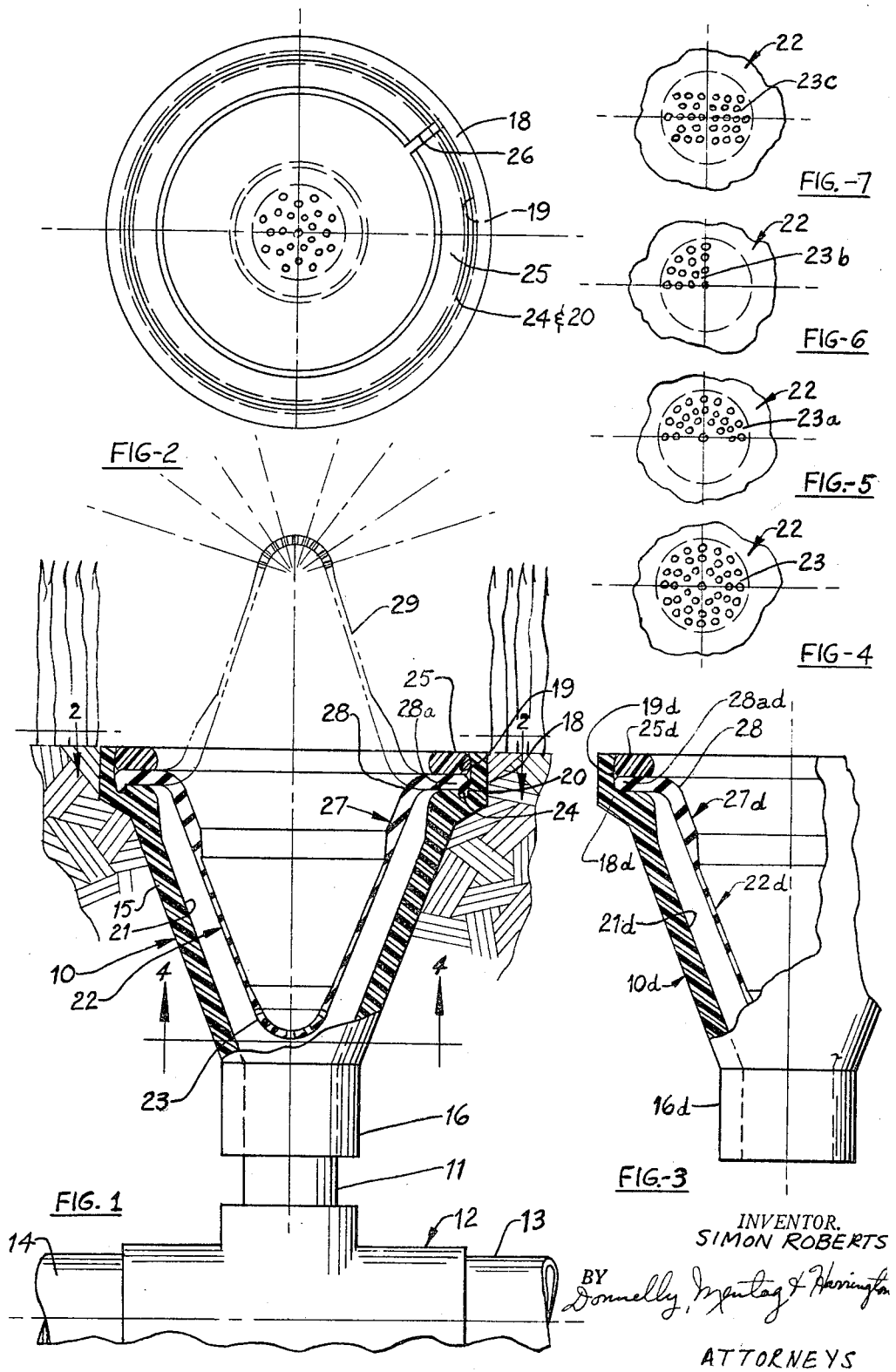

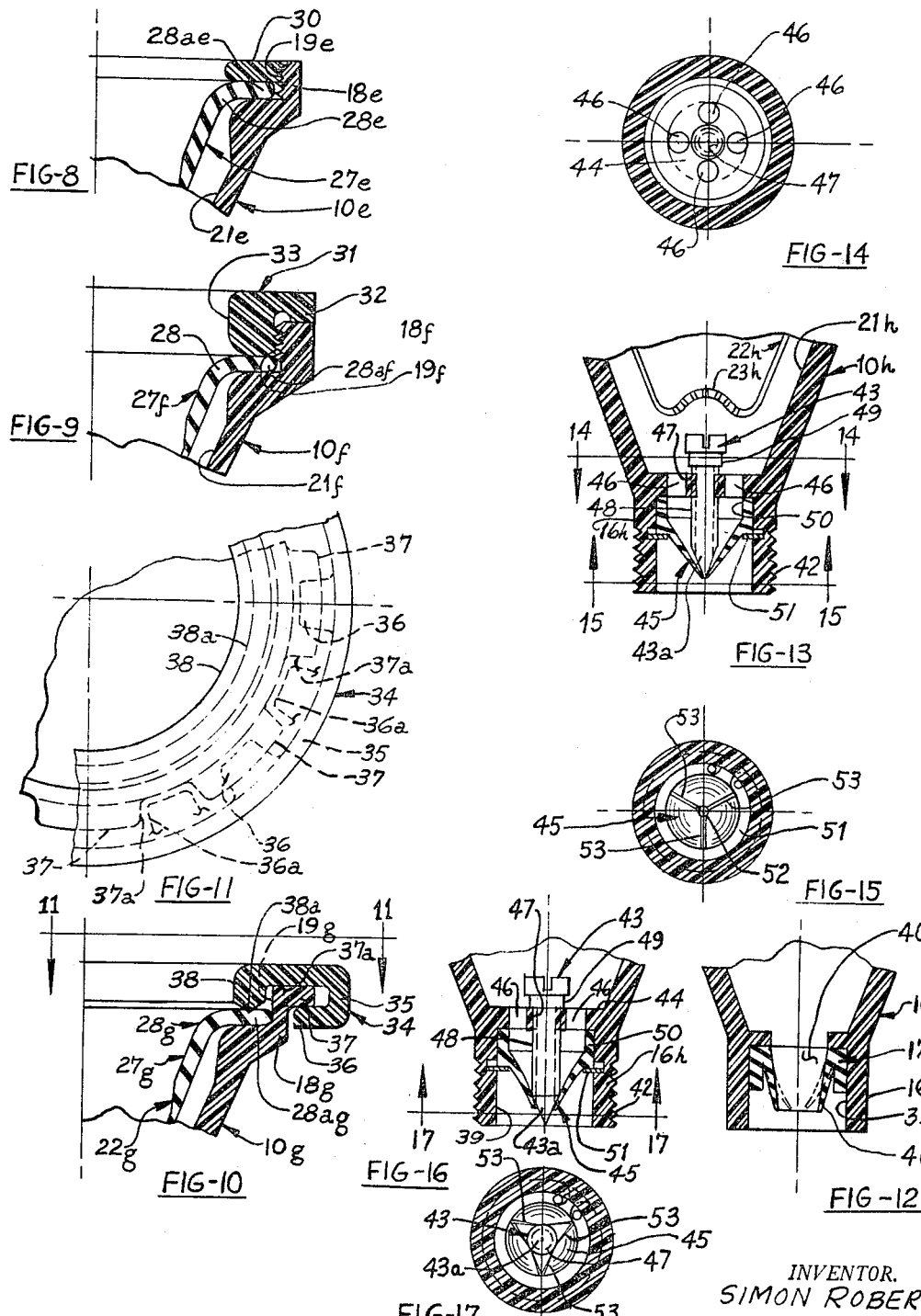

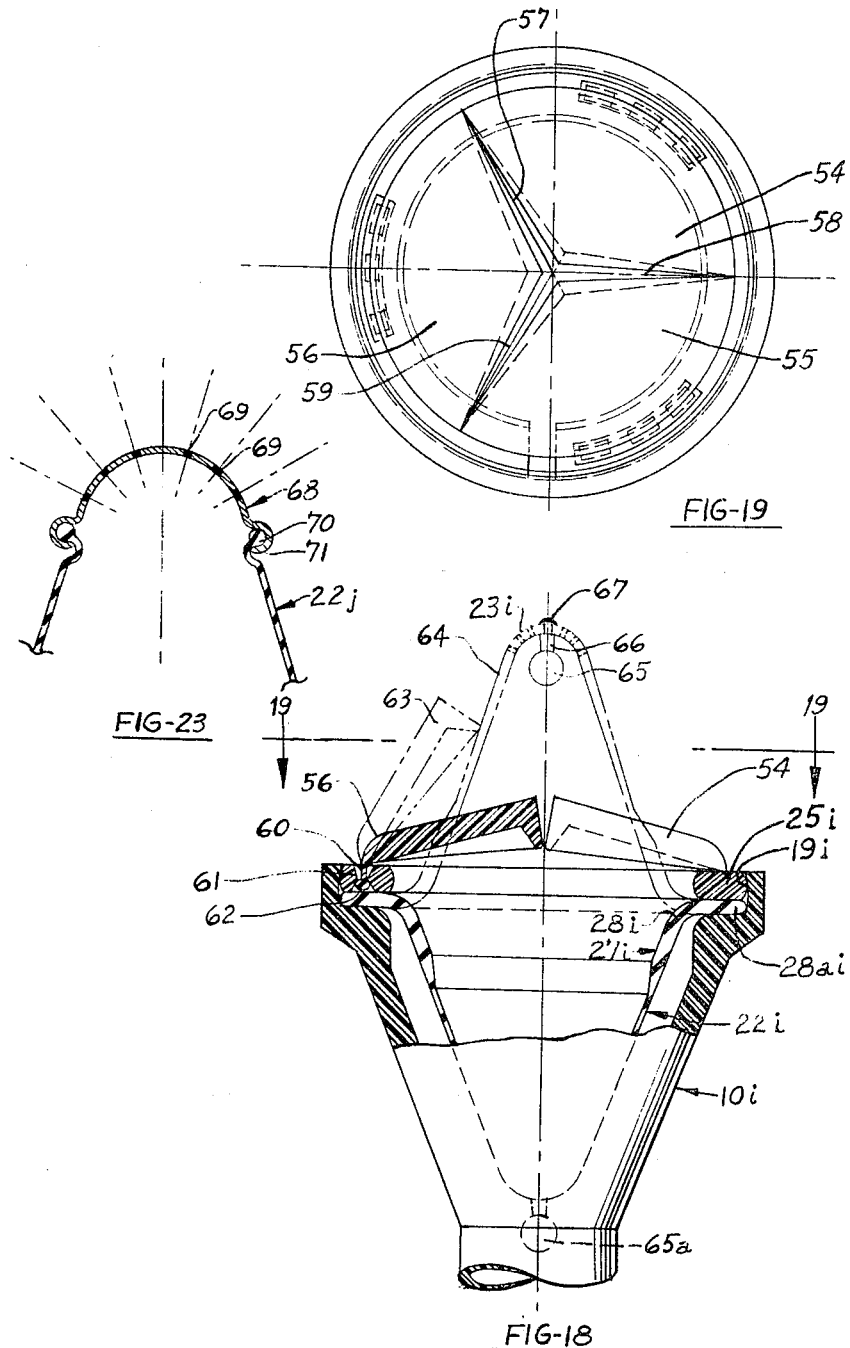

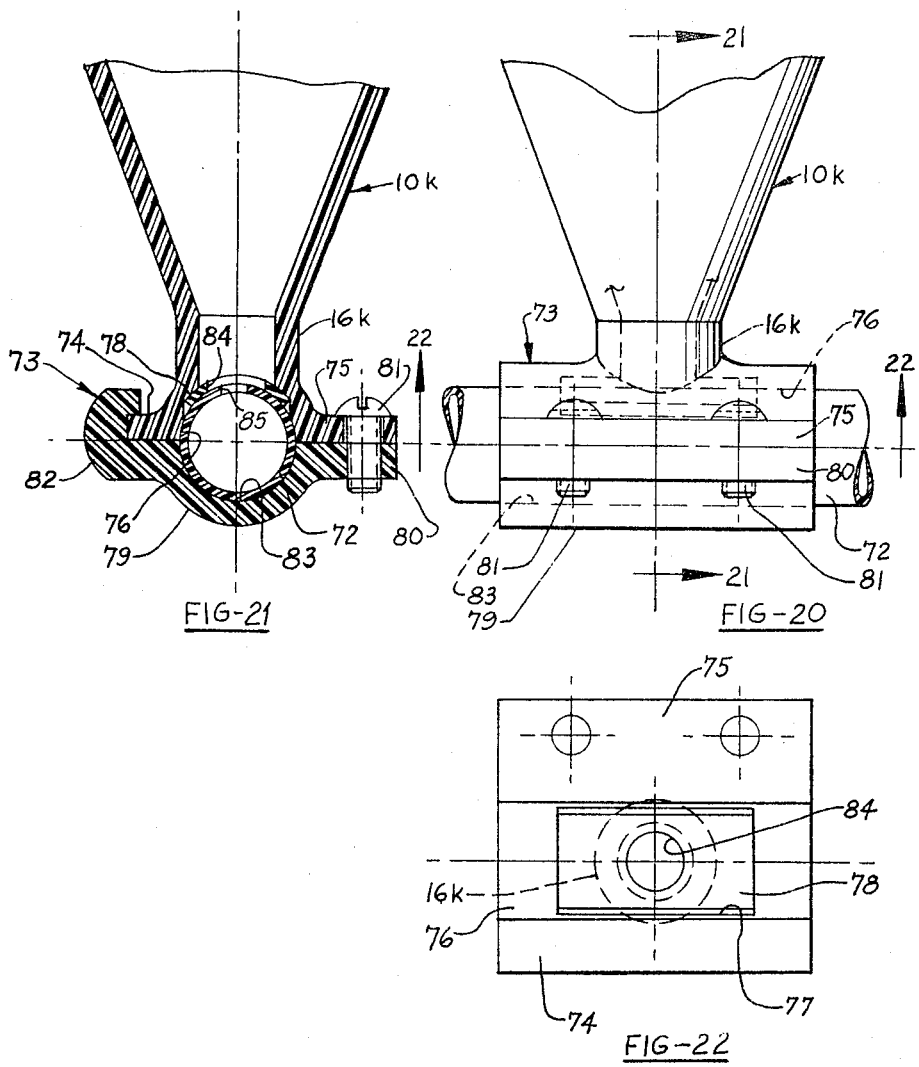

3,282,508
SELF-RETRACTING LAWN SPRINKLER NOZZLE
Simon Roberts, 20177 McIntyre, Detroit, Mich.
Filed June 24, 1964, Ser. No. 377,594
12 Claims. (Cl. 239—204)

This invention relates generally to improvements in underground lawn sprinkler systems, and more particularly, to an improved underground lawn sprinkler head embodying a novel self-retracting lawn sprinkler nozzle.

Heretofore, there have been many types of underground lawn sprinkler heads available on the market, but all such prior devices have inherent disadvantages which detract from their usefulness. In an attempt to provide a self-retracting sprinkler head which will permit use of lawn mowers without removing such sprinkler heads, it has been proposed to provide expensive brass retractable sprinkler heads of the telescoping type which have relatively close fitting parts. Such prior art lawn sprinkler heads become clogged easily and are made inoperative by hard water deposits and foreign matter getting between the telescoping parts. Such harmful action to these types of sprinkler heads is particularly evident in the early spring after a long period of non-use. The effort and money required to service a system provided with such telescopic sprinkler heads cancels out the advantage of having such an underground lawn sprinkling system, namely, the advantage of a carefree lawn maintenance sprinkling system. Another disadvantage of the aforementioned prior art sprinkler head, is a direct result of the above mentioned conditions, namely the possibility of people injuring themselves in tripping over such a head which is not fully retracted because of the aforementioned disadvantages, or the damaging of a lawn mower and possible shearing of the sprinkler head and flinging it outwardly from the lawn mower at a high velocity and injuring a person or some property.

Because the manufacture of the aforementioned prior art telescoping sprinkler heads is expensive due to the high cost of labor to machine the parts and the high cost of the noncorrosive material employed in the same, attempts have been made to translate the same basic design into plastic material. When such sprinkler heads are made of plastic materials, the aforementioned problems are multiplied because of the lightness of the parts and the greater possibility of grit and dirt embedment in the softer plastic material used. Furthermore, such plastic sprinkler heads are not as reliable as the brass valves.

In view of the foregoing, it is the primary object of the present invention to provide a novel and improved sprinkler head for an underground lawn sprinkler system which will not be sensitive to hard water deposits or foreign materials. The sprinkler head of the present invention is constructed and arranged so that the inherent action of the sprinkler head in operation ejects any exterior material deposited thereon and peels off any hard water deposits.

It is another object of the present invention to provide a novel and improved sprinkler head for an underground lawn sprinkler system which is non-clogging, self-cleaning, and inexpensive and easy to service. Servicing of the sprinkler head of the present invention can be accomplished with common tools in a minimum of time and with a minimum of labor and expense.

It is a further object of the present invention to provide a novel and improved lawn sprinkler head for use in underground lawn sprinkling systems which is simple and compace in construction, economical of manufacture and efficient in operation. The sprinkler head of the present invention can be installed in an underground lawn sprinkling system with a minimum of labor, in a short time, and without the need for any special skill or training.

It is still another object of the present invention to provide a novel and improved lawn sprinkler head for use in underground lawn sprinkling systems which comprises a body portion adapted to be attached to the underground water supply pipe by means of a suitable vertical riser pipe, a flexible self-retracting nozzle which is removably attached to the body, and a retaining ring for quickly and easily attaching and detaching the nozzle to the body. The body portion may alternatively be attached directly to the underground water supply pipe by means of a male thread connection. The sprinkler head may be provided with a self-opening and self-closing cover means. The sprinkler head may further be provided with an integrated flow valve means.

Other objects, features and advantages of this invention will be apparent from the following detailed description, appended claims, and the accompanying drawings.

In the drawings:

FIG. 1 is a side elevational view, partly in section, of a lawn sprinkler head made in accordance with the principles of the present invention and showing the same connected to an underground lawn sprinkling system;

FIG. 2 is a plan view of the lawn sprinkler head illustrated in FIG. 1, taken along the line 2—2 thereof, and looking in the direction of the arrows;

FIG. 3 is a fragmentary side elevational view of a modified lawn sprinkler head of the type shown in FIG. 1, with parts shown in section, showing the self-retracting sprinkler head nozzle with a slightly modified bead or lip;

FIG. 4 is a fragmentary bottom view of the nozzle illustrated in FIG. 1, taken along the line 4—4 thereof, looking in the direction of the arrows, and showing a typical nozzle hole pattern for a full 360° spray action;

FIG. 5 is a fragmentary bottom view of a modified nozzle, similar to FIG. 4, and showing a typical nozzle hole pattern for a half or 180° spray action, for use near a sidewalk or a drive;

FIG. 6 is a fragmentary bottom view of another modified nozzle, similar to FIG. 4, and showing a typical nozzle hole pattern to provide a quarter or 90° spray action, for use in the corner of a lawn;

FIG. 7 is a fragmentary bottom view of a further modification of a sprinkler head nozzle similar to FIG. 4, and showing a typical nozzle hole pattern to provide a rectangular spray for use in such places as at the side of a house or in an area between a sidewalk and a street;

FIG. 8 is a fragmentary elevational sectional view illustrating a modified threaded retainer ring adapted to hold the self-retracting sprinkler nozzle in the sprinkler head;

FIG. 9 is a fragmentary elevational sectional view of another modified type of threaded retainer ring employed for holding the self-retracting sprinkler nozzle in the sprinkler head;

FIG. 10 is a fragmentary, elevational sectional view of a further modified bayonet type of retainer ring employed for holding the self-retracting sprinkler nozzle in the sprinkler head;

FIG. 11 is a fragmentary, plan view of the structure illustrated in FIG. 10, taken along the line 11—11 thereof, and looking in the direction of the arrows;

FIG. 12 is a fragmentary elevational sectional view of the lower end of a sprinkler head body made in accordance with the principles of the present invention, and showing a flow regulating valve incorporated therein;

FIG. 13 is a fragmentary, elevational sectional view of a modified sprinkler head made in accordance with the principles of the present invention, and showing a second type of flow regulating valve adapted to be used in the invention;

FIG. 14 is a fragmentary, horizontal sectional view of the structure illustrated in FIG. 13, taken along the line 14—14 thereof, and looking in the direction of the arrows;

FIG. 15 is a horizontal sectional view of the structure illustrated in FIG. 14, taken along the line 15—15 thereof, and looking in the direction of the arrows;

FIG. 16 is a fragmentary, elevational view of the valve structure illustrated in FIG. 13, showing the valve screw moved downwardly to an advanced position to open the slits in the conical end of the valve to permit increased water flow through the valve;

FIG. 17 is a plan view of the valve structure illustrated in FIG. 16, taken along the line 17—17 thereof, and looking in the direction of the arrows;

FIG. 18 is an elevational sectional view of a lawn sprinkler head made in accordance with the principles of the present invention, and showing the self-retracting sprinkler nozzle provided with a self-opening and self-closing cover means;

FIG. 19 is a top plan view of the structure illustrated in FIG. 18, taken along the line 19—19 thereof, and looking in the direction of the arrows;

FIG. 20 is another embodiment of the invention illustrating a further method for securing the sprinkler head 10 to an underground water conduit;

FIG. 21 is a fragmentary, elevational sectional view of the structure illustrated in FIG. 20, taken along the line 21—21 thereof, and looking in the direction of the arrows;

FIG. 22 is a horizontal, bottom view of the upper portion of the sprinkler head clamping attachment structure illustrated in FIG. 20, taken along the line 22—22 thereof, looking in the direction of the arrows, and with the water piper removed; and, FIG. 23 is an enlarged, partial sectional view of a nozzle showing a separately formed nozzle nose.

Referring now to the drawings and in particular to FIGS. 1 and 2, wherein is shown an illusrtative embodiment of the invention, the numeral 10 generally indicates a sprinkler head which is operatively connected to the riser pipe 11. The rise pipe 11 is connected in the usual way to the T fitting 12 which is connected to the water supply system of an underground lawn sprinkling system by means of the pipes 13 and 14. It will be understood that a plurality of the sprinkler heads 10 would be connected in the lawn sprinkling system in various desired positions around a lawn. The sprinkler head 10 may also be directly attached to the fitting 12 by threading the lower end of the body 10.

As best seen in FIG. 1, the sprinkler head body 10 includes the main portion 15 which is substantially frustoconical in shape and which has formed at the lower end thereof a reduced cylindrical portion 16 in which is mounted a suitable flow regulating valve, generally indicated by the numeral 17 in FIG. 12. Integrally formed around the upper, open, larger end of the frustoconical body 10 is the annular retainer flange 18 in which is formed the recess 19 having the downwardly extended peripheral retainer groove 20.

As best seen in FIG. 1, the frustoconical body 10 is hollow and is provided with the inverted frustoconically shaped chamber 21 in which is operatively mounted the self-retracting flexible nozzle generally indicated by the numeral 22. The flexible nozzle 22 is frustoconical in shape and as shown in FIG. 1, in an inactive or inoperative position with the larger end disposed upwardly, and the lower end disposed downwardly and provided with the rounded tip or nose 23. The flexible nozzle 22 may be made from any suitable flexible or pliant weather resistant material, such as rubber, plastic or the like. As shown in FIG. 1, the upper portion of the nozzle 22 is enlarged in thickness or cross-section as generally indicated by the numeral 27 for strength purposes and to provide the nozzle with a retracting characteristic. The larger or base end 27 of the nozzle 22 is provided with a horizontal flange 28a having a peripheral, downwardly projected bead 24 which is adapted to be quickly and easily seated in the peripheral retainer groove 20 without the use of any special tools. The bead 24 is detachably retained in the retainer groove 20 by means of the snap ring 25 which is provided with the transverse slit 26 to provide for quick and easy mounting and removal of the snap ring 25 in place in the recess 19 over the bead 24 so as to hold it in position in the retainer groove 20. The snap ring 25 may be mounted in the recess 19 over the bead 24 when the nozzle 22 is in the retracted position shown in FIG. 1, without the need for any special tools. The snap ring 25 coacts with the bead 24 to provide a suitable sealing action around the periphery of the enlarged end of the nozzle 22. The radius 28 of the enlarged portion 27 is moulded or formed to a shape similar to that shown in FIG. 1. Accordingly, when the nozzle is expanded outwardly to the operative dotted line position 29, the radius 28 is sprung open. Accordingly, when the water pressure in the system is shut off, the radius 28 does not want to maintain the open position of the nozzle and has a tendency to return to the solid line position shown in FIG. 1. It will thus be seen that the nozzle has a built-in self-retracting tendency which functions with gravity to return the nozzle to the inoperative solid line position shown in FIG. 1 when the water pressure in the lawn sprinkling system is shut off.

The tip 23 of the nozzle 22 may be provided with any type hole arrangement to provide a desired spray pattern or action. For example, FIG. 4 shows a plurality of holes formed in the nozzle nose 23 so as to provide a full 360° spray pattern. FIG. 5 shows a nozzle nose 23a in which the nozzle 22 is provided with holes arranged over a 180° area so as to provide a 180° spray pattern. FIG. 6 shows a nozzle nose 23b wherein the holes are disposed over a 90° area to provide a 90° spray pattern. FIG. 7 shows a nozzle nose 23c in which the holes are disposed to provide a rectangular spray pattern.

The nozzle hole pattern of FIG. 4 would be used in the nozzle 22 when the sprinkler head is disposed in the middle of a lawn. The nozzle hole pattern shown in FIG. 5 would be used when a sprinkler head is disposed near a sidewalk or a drive. The hole pattern illustrated in FIG. 6 would be used in a nozzle 22 when the sprinkler head is used in a corner of a lawn. The nozzle hole pattern illustrated in FIG. 7 is adapted to be used when the sprinkler head is disposed along the side of a house or in the area between a sidewalk and the street.

FIG. 3 illustrates a slight modification of the construction of the body 10 and the nozzle 22. The various parts of this embodiment have been marked with the same reference numerals as used in the embodiment of FIGS. 1 and 2, followed by the small letter "d." In the embodiment of FIG. 3, the nozzle 22d is held in the recess 19d by means of the clip ring 25d without the use of a retainer bead 24. The body 10d is not provided with any retainer groove 20.

FIG. 8 illustrates a fragmentary portion of a further modified sprinkler head and the corresponding parts have been marked with the same reference numerals as used in FIG. 1, followed by the small letter "e." In this modification the annular recess 19e is threaded for the reception of an externally threaded flat retainer ring 30. It will be seen that the horizontal flange of the thickened nozzle portion 27e is secured in place in the recess 19e by means of the threaded retainer ring 30.

FIG. 9 illustrates still another modification of the invention wherein the retainer ring means is slightly changed. The parts of the embodiment of FIG. 9 which correspond to the embodiment of FIG. 1 are marked with the same reference numerals followed by the small letter "f." In this embodiment, the annular recess 19f of the body 10f is threaded to receive the threaded portion 33 of the retainer ring 31. The retainer ring 31 is provided with the extension 32 which is adapted to abut the outer end face of the body flange 18f. The retainer ring portion 33 engages the upper end of the nozzle 20f and secures it in place in the body 10f.

FIGS. 10 and 11 illustrate still a further embodiment of the invention in which the means for securing a nozzle in the sprinkler head body is changed. The parts of the embodiment of FIGS. 10 and 11 which are the same as the embodiment of FIG. 1 are marked with the same reference numerals followed by the small letter "g." In this embodiment, the upper peripheral horizontal flange 28g of the nozzle 22g is disposed in the recess 19g formed in the flange 18g. The retainer ring 34 is provided with the downwardly extended, vertical peripheral wall 35 which is provided with a plurality of horizontal inwardly extended projections 36 which are adapted to engage a lower side of the tangs 37 formed as part of the flange 18g.

As shown in FIG. 11, the tangs 37 are peripherally spaced apart by the inwardly extended recesses 37a through which are mounted the projections 36 as shown by the dotted line position 36a in FIG. 11, when the ring 34 is initially mounted on the flange 18g of the body 10g. FIG. 11 also illustrates the peripherally spaced apart positions of the inwardly extended projections 36 in the locked position. It will be understood that in order to lock the retainer ring 34 to the body flange 18g, that the ring 34 is rotated in either the clockwise or counterclockwise direction so as to move the projections 36 from the positions 36a to the positions shown in FIG. 11 where the projections 36 are frictionally engaged with the lower side of the tangs 37 in order to retain the ring 34 on the body flange 18g. As shown in FIGS. 10 and 11, the retainer ring 34 is provided with an inner downwardly extended peripheral wall 38 which is provided on the lower end thereof with the annular downwardly facing contact lip 38a which is adapted to engage the horizontal flange 28ag of the nozzle portion 27g and press it down into a sealing engagement with the body flange 18ag.

As shown in FIG. 12, a first type of valve 17 may be used in the lower end of the body 10 and the part indicated by the numeral 16. The valve 17 comprises the cylindrical member formed from a suitable flexible material as rubber, and which is adapted to be seated in the enlarged bore 39 in the lower end of the body portion 16. The valve member or body is provided with the bore 40 and formed integral with the body portion is a downwardly extended conically shaped projection 41 which is adapted to flex inwardly and outwardly as the pressure in the system varies. The valve 17 functions to control the pressure changes in the water pressure line of the system which are due to friction or water pressure differences in the overall water supply system.

FIGS. 13 through 17 illustrate the second type flow control valve which may be used in combination with the sprinkler head of the present invention. The identical parts of the sprinkler head of the embodiments of FIGS. 13 through 17 which are same as in the embodiment of FIG. 1, are marked with the same reference numerals followed by the small letter "h." In this embodiment, the sprinkler head body 10h is provided with the thread 42 on the lower end of the portion 16 so that the body 10h may be threadably mounted directly into the outlet port of the T-fitting 12. The valve structure illustrated in FIGS. 13 through 17 is adapted to take into account the differences in flow quantity when less water is required, such as when a 90° or a 180° spray pattern is used in the nozzle head 23h. The modified valve construction has to be adjusted for each spray pattern, but it is adapted to cover all conditions of use.

As best seen in FIG. 13, this modified valve comprises generally three parts, namely, the valve 43 formed as a modified screw member which is adjustably mounted in the body lower end wall 44 and the valve body 45. As shown in FIG. 14, the body end wall 44 is provided with a plurality of suitably shaped holes 46 which provide passageways for the flow of water therethrough. The bore 47 is threaded for the threadable reception of the elongated rod 48 of the valve 43. The valve 43 is provided with the screw head enlarged upper end 49 which is integral with the body or elongated rod 48. The lower end of the valve 43 is provided with conically shaped nose 43a which is adapted to function in the following described manner.

The valve body 45 comprises a flexible membrane made from any suitable flexible or pliant material as rubber or the like. The body 45 is conically shaped and the upper enlarged open end 50 is seated in the sprinkler head body portion 39 and is detachably secured in place by means of the conventional retainer snap ring 51, as shown in FIG. 13.

The valve body 45 extends downwardly in the sprinkler head cylindrical body portion 16h and is provided with a central hole 52 (FIG. 15) formed by the apex of the three slits 53 and into which the conical nose 43a of the valve 43 extends. The valve body is further provided with a plurality of radially disposed slits 53 which communicate at the inner ends thereof with the hole 52. It will be seen that the amount of opening of the slits 53 is controlled by the vertical position of the valve nose 43a. When the valve 43 is threaded downwardly as viewed in FIG. 16, the nose 43a will be pushed downwardly into the hole 52 to open the slits 53 as shown in FIG. 16 to permit a large flow of water through the valve and into the sprinkler head 10h. A reverse action is provided when the screw valve 43 is threaded upwardly to permit the valve body 45 to close the slits 53 by means of the inherent flexible action of the valve body 45. It will be understood that the water pressure in the water supply line tends to bias the valve body 45 upwardly so as to close the slits 53. The valve 43 thus is adapted to open the slits 53 against the water pressure to the desired water flow condition. The water flows through the slits 53 and thence through the holes 46 and into the chamber 21h of the sprinkler head body 10h.

FIGS. 18 and 19 illustrate another embodiment of the invention in which the self-retracting nozzle is enclosed by a cover means. The sprinkler head body is indicated by the numeral 10i and the nozzle is indicated by the numeral 22i. The body 10i and nozzle 22i may be in accordance with the structures of the previously described sprinkler head bodies and nozzles.

The cover of the embodiment of FIGS 18 and 19 comprises the three identical parts 54, 55 and 56 which are each formed as a sector of a circle. Each of these cover parts are equal in size and are joined along the radius lines 57, 58 and 59. The outer edges of these cover parts are semicircular in shape and are provided with downwardly extended hinge portions as indicated by the numeral 60 in FIG. 18. The hinge portions 60 of the cover parts 54, 55 and 56 are adapted to be retained by one or more enlarged portions 62 of the hinge 60 which are held in suitable slots as indicated by the numeral 61 and which are formed in the retainer ring 25i. The retainer ring 25i may be formed in the same manner as the retainer rings shown in FIGS. 1, 8 and 9. Although only one hinge 60 is shown, it will be understood that each of the cover parts 54, 55 and 56 may be provided with one or more hinges if desired.

The hinges 60 of the cover parts are provided with a bias which is designed into the hinges and will normally bias the cover parts 54, 55 and 56 downwardly into closing position as shown in FIGS. 18 and 19. The dotted line position of the one cover part 56 as indicated by the numeral 63 in FIG. 18, illustrates a raised or open position of the cover part 56 and shows the extended nozzle as indicated by the dotted line 64.

It will be understood that when there is no flow in the lawn sprinkling system that the cover parts 54, 55 and 56 will remain in the down or closed position, and the crown or conical shape of the cover will support the weight of persons walking on the cover head. The cover illustrated in FIGS. 18 and 19 will exclude dirt from falling into the retracted nozzle 22i and prevent children or vandals from poking the flexible nozzle 22i. The built-in bias action of the cover parts will also help to move the flexible nozzle 22i downwardly into the retracted position when the water pressure is shut off. The hinge portion 60 extends for approximately one-third of the peripheral length of each of the cover parts 54, 55 and 56. When the water pressure in the system is turned on, the diaphragm-type head of the nozzle tips these cover parts upwardly. The movement of the cover parts to the dotted line positions 63 creates a bias on the thinned portion of the cover which connects the end portion 60 to the cover portions. Accordingly, as soon as the water pressure in the system is turned off, the nozzle drops back into its normal inoperative position as shown in FIG. 1, and the cover parts 54, 55 and 56 move downwardly to the closed position. This closing action is caused both by gravity and the tendency of the cover hinge parts to return to their original positions. The radius formed at the junction of the hinge and the cover parts wants to maintain its constant position.

The flexible self-retracting nozzle 22 may be made from a single piece of the aforedescribed materials, or it may be made from a plurality of pieces with suitable reinforcement parts which would determine its operating characteristics. The nozzle 22 will be constructed so as to provide self-retraction of the nozzle into the retracted position shown in FIG. 1 when the water pressure in the lawn sprinkling system is removed. The bead or flange portion 24 is thickened as compared to the other portion of the nozzle. The connective radius portion 28 of the nozzle structure, as shown in FIG. 1, is placed under heavy stress when the nozzle 22 is extended into the operating position 29 shown in FIG. 1. The inner surface of the connective radius portion 28 is stretched and the outer surface is compressed. This stressed nozzle condition is brought about by the hydraulic pressure of the water and this stress biases the nozzle 22 so that it will retract into the inoperative position shown in FIG. 1. The lower portion of the nozzle 22 is made to a smaller thickness as compared to the portion 27 connected to the sprinkler body 10 so that it can collapse upon itself for retracting movement back into the body 10. The extreme nose portion 23 is preferably thickened to provide better support for the discharge holes formed therethrough.

In use, water under pressure is admitted into the system pipe 13 and thence through the T 12 and into the riser pipe 11. The water under pressure then flows into the sprinkler head body 10 and the flexible nozzle 22 is hydraulically raised to the spraying position 29 shown in FIG. 1 whereby its spray pattern is clear of interference from the surrounding grass. When the water pressure is cut off in the lawn sprinkling system, the nozzle 22 will be inwardly retracted by its inherent tendency, because of the aforedescribed stress conditions in the connective radius portion of the nozzle.

As shown in FIG. 18, the nozzle 22i may be provided with a weight designated by the numeral 65 which is adapted to help the sprinkler head to drop to the inoperative position more quickly when the water pressure is discontinued or shut off. The weight 65 is provided with a spacer neck 66 to maintain the weight 65 in a spaced apart position from the holes in the nose 23i to permit uninterrupted flow of water therethrough. The neck 66 is adapted to be fixedly connected to the sprinkler nozzle 22i by any suitable means, as by a rivet 67. The weight 65 is shown as being preferably formed ball shaped, although it will be understood that any other suitable shape may be used. The weight 65 may be used with an all plastic nozzle head 22i which is flexible, or it may be used with a combination nozzle 22j of the type shown in FIG. 23. The numeral 65a in FIG. 18 designates the retracted position of the weight 65.

FIG. 23 illustrates a nozzle 22j which may be partially formed from the same materials as the aforedescribed nozzles of the other embodiments, and with the nose of the flexible nozzle being separately formed and from a suitable corrosion resistant metal, as brass or the like. The brass nose is generally designated by the numeral 68 and is provided with the usual spray holes 69. The arrangement or pattern of the holes 69 may be any one of the types illustrated in the aforedescribed FIGS. 4 through 7. As shown in FIG. 23, the nozzle 22j is provided on the open lower conical end thereof with a peripheral lip 70 which is circular in cross section, and which is adapted to receive the lower arcuate peripheral flange 71 of the sprinkler head 68. It will be understood that the flange 71 may be secured on the lip 70 by any suitable means, as by being crimped thereon, by bonding or by an adhesive.

FIGS. 20, 21 and 22 illustrate a further embodiment of the invention wherein the sprinkler head 10k is shown as being attached to a continuous underground water pipe 72 by means of a novel clamping attachment means generally indicated by the numeral 73. The clamping attachment means 73 is adapted to be attached to the pipe 72 in any desired location without cutting the pipe 72. The use of the clamping attachment means 73 provides an underground sprinkling system incorporating a great degree of flexibility because the sprinkler heads may be located in widely separated positions, in a quick and economical manner, as compared to using the conventional type pipe fittings which involve additional time and labor, and parts.

As shown in FIGS. 20, 21 and 22, the sprinkler head 10k is provided with the usual downwardly extended circular bottom end portion 16k, on the lower end of which is integrally formed the upper portion of the clamping attachment means 73. As best seen in FIGS. 20, 21 and 22, the upper portion of the clamping attachment means 73 comprises an elongated male retainer flange 74 which extends longitudinally of the pipe 72. The upper clamping attachment means portion further includes a clamping retainer flange 75 which is disposed opposite to the retainer flange 74. As shown in FIGS. 21 and 22, the flanges 74 and 75 are provided with a flat surface on the lower end thereof and these surfaces are interconnected by the upwardly disposed concave surface 76 which is provided with an elongated recess 77 for the reception of the pipe seal 78. It will be understood that the seal 78 may be formed to other shapes other than that shown. The upper portion of the clamping attachment means 73 is adapted to be seated on the convexly shaped outer surface of the pipe 72 and to be secured thereto by the lower portion of the clamping attachment means 73. This lower portion is provided with the central elongated portion 79 along one side of which is integrally formed the clamping flange 80 which is adapted to be seated against the clamping flange 75 on the upper portion and to be secured thereto by any suitable means, as by the screw 81 which may be made from any suitable non-corrosion material. The lower clamping attachment portion is further provided on the other side of the central portion 79 with a C-shaped female retainer flange 82 which is adapted to receive the male retainer flange 74. The lower clamping attachment means portion 79 is provided with the longitudinally extended downwardly disposed concavely shaped recess 83 which is adapted to receive the lower half of the pipe 72.

As shown in FIGS. 21 and 22, the seal 78 is provided with a hole 84 which is adapted to be aligned with the hole 85 formed in the pipe 72. It will be understood that the hole 85 is formed in a location in the pipe 72 in accordance with the desired location of the sprinkler head in a lawn. In the use of the embodiment of FIGS. 20, 21 and 22, the hole 85 is formed in the pipe 72 in a desired location, and the sprinkler head 10k is then quickly and easily mounted in place on the pipe 72 by first positioning the upper portion of the clamping attachment means 73 on the pipe and then mounting the lower portion of said means in position and securing it in place by means of the screws 81.

Experience has shown that the sprinkler head of the present invention is a practical and efficient device.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In an underground lawn sprinkling system, the combination comprising: a water supply means; a tubular body member connected at the lower end thereof to the water supply means and being open at the upper end thereof; a self-retracting sprinkler nozzle mounted in said tubular body member; said sprinkler nozzle being made primarily from a pliable material; the lower end of said nozzle being provided with a plurality of holes; the upper end of said nozzle being provided with an outwardly extended flange and immediately adjacent thereto, a connective radius portion, said flange being disposed on the axial end of the periphery of the open upper end of said tubular body member; said outwardly extended flange and said connective radius portion each having a thicker cross section than the lower end of said nozzle; means for retaining the outwardly extended flange on the upper end of said self-retracting sprinkler nozzle in sealing detachable engagement with the axial end of said tubular body member; and, said connective radius portion of said self-retracting nozzle being stressed upon extension of said nozzle outwardly of said tubular body member when water under pressure is admitted through said water supply means and into said tubular body member and said nozzle being retracted into said tubular body member by the stress conditions in the connective radius portion when the water supply is shut off.

2. The structure as defined in claim 1, wherein: said means for retaining the upper end of said self-retracting sprinkler nozzle on said tubular body member comprises a snap ring.

3. The structure as defined in claim 1, wherein: said tubular body member is provided with a valve on the lower end thereof to control the flow of water into the tubular body member.

4. The structure as defined in claim 1, wherein: said self-retracting sprinkler nozzle is provided with a weight to assist the retracting movement of the nozzle into the tubular body when the water supply is shut off.

5. The structure as defined in claim 1, wherein: said tubular body is provided on the lower end thereof with a clamping attachment means for connecting a tubular body directly to the water supply means.

6. The structure as defined in claim 5, wherein: said clamping attachment means includes an upper portion on the lower end of the tubular body, a detachable lower portion adapted to be secured to the upper portion; means for detachably securing said portions together; and said clamping portions being adapted to hold a water supply pipe therebetween and to be mounted over a hole in said pipe for admitting water into the tubular body.

7. The structure as defined in claim 1, wherein: said nozzle is provided with an attached nose made from a corrosion resistant material.

8. In an underground lawn sprinkling system, the combination comprising: a water supply means; a tubular body member connected at the lower end thereof to the water supply means and being open at the upper end thereof; a self-retracting sprinkler nozzle mounted in said tubular body; said sprinkler nozzle being made from a pliable material; the lower end of said nozzle being provided with a plurality of holes; the upper end of said nozzle being provided with an outwardly extended flange disposed on the periphery of the open upper end of said tubular body member; means for retaining the upper end of said self-retracting sprinkler nozzle in sealing detachable engagement with said tubular body member; said self-retracting nozzle being extendable outwardly of said tubular body member when water under pressure is admitted through said water supply means and into said tubular body member and said nozzle being self-retractable into said tubular body member when the water supply is shut off; and, said means for retaining the upper end of said self-retracting sprinkler nozzle on said tubular body member comprising a retaining ring threadably mounted in the upper end of said tubular body.

9. In an underground lawn sprinkling system, the combination comprising: a water supply means; a tubular body member connected at the lower end thereof to the water supply means and being open at the upper end thereof; a self-retracting sprinkler nozzle mounted in said tubular body; said sprinkler nozzle being made from a pliable material; the lower end of said nozzle being provided with a plurality of holes; the upper end of said nozzle being provided with an outwardly extended flange disposed on the periphery of the open upper end of said tubular body member; means for retaining the upper end of said self-retracting sprinkler nozzle in sealing detachable engagement with said tubular body member; said self-retracting nozzle being extendable outwardly of said tubular body member when water under pressure is admitted through said water supply means and into said tubular body member and said nozzle being self-retractable into said tubular body member when the water supply is shut off; and, said means for retaining the upper end of said self-retracting sprinkler nozzle on said tubular body member comprising a retaining ring threadably mounted on the upper end of the tubular body member and having a portion adapted to abut the tubular body member.

10. In an underground lawn sprinkling system, the combination comprising: a water supply means; a tubular body member connected at the lower end thereof to the water supply means and being open at the upper end thereof; a self-retracting sprinkler nozzle mounted in said tubular body; said sprinkler nozzle being made from a pliable material; the lower end of said nozzle being provided with a plurality of holes; the upper end of said nozzle being provided with an outwardly extended flange disposed on the periphery of the open upper end of said tubular body member; means for retaining the upper end of said self-retracting sprinkler nozzle in sealing detachable engagement with said tubular body member; said self-retracting nozzle being extendable outwardly of said tubular body member when water under pressure is admitted through said water supply means and into said tubular body member and said nozzle being self-retractable into said tubular body member when the water supply is shut off; and, said means for retaining the upper end of said self-retracting sprinkler nozzle on said tubular body comprising a rotatably mounted retainer ring having projections thereon adapted to be engaged with projections on the tubular body member for securing the retainer ring in fixed positions on the tubular body member and to hold the upper end of the sprinkler nozzle in place on the tubular body member.

11. In an underground lawn sprinkling system, the combination comprising: a water supply means; a tubular body member connected at the lower end thereof to the water supply means and being open at the upper end thereof; a self-retracting sprinkler nozzle mounted in said tubular body; said sprinkler nozzle being made from a pliable material; the lower end of said nozzle being provided with a plurality of holes; the upper end of said nozzle being provided with an outwardly extended flange disposed on the periphery of the open upper end of said subular body member; means for retaining the upper end of said self-retracting sprinkler nozzle in sealing detachable engagement with said tubular body member; said self-retracting nozzle being extendable outwardly of said tubular body member when water under pressure is admitted through said water supply means and into said tubular body member and said nozzle being self-retractable into said tubular body member when the water supply is shut off; and, said valve including a flexible valve member having a plurality of slots formed therein, and means adjustably mounted for controlling the opening of said slots.

12. In an underground lawn sprinkling system, the combination, comprising: a water supply means; a tubular body member connected at the lower end thereof to the water supply means and being open at the upper end thereof; a self-retracting sprinkler nozzle mounted in said tubular body; said sprinkler nozzle being made from a pliable material; the lower end of said nozzle being provided with a plurality of holes; the upper end of said nozzle being provided with an outwardly extended flange disposed on the periphery of the open upper end of said tubular body member; means for retaining the upper end of said self-retracting sprinkler nozzle in sealing detachable engagement with said tubular body member; said self-retracting nozzle being extendable outwardly of said tubular body member when water under pressure is admitted through said water supply means and into said tubular body member and said nozzle being self-retractable into said tubular body member when the water supply is shut off; and, said tubular body being provided on the upper end thereof with a self-closing cover means made from a plurality of parts which are semi-circular in shape and which are provided with hinge portions operatively attached to the upper end of the tubular body member.

References Cited by the Examiner
UNITED STATES PATENTS

| | | | |
|---|---|---|---|
| 1,152,636 | 9/1915 | Houston | 239—201 X |
| 1,651,887 | 12/1927 | Hawes | 239—267 |
| 1,958,385 | 5/1934 | Sweetland | 239—204 |
| 2,035,329 | 3/1936 | McPhail | 251—212 |
| 2,360,203 | 10/1944 | Cox | 239—204 |
| 2,517,457 | 8/1950 | Allen | 214—11 |
| 2,593,315 | 4/1952 | Kraft | 138—45 |
| 2,901,183 | 8/1959 | Kohl | 239—205 |
| 3,084,869 | 4/1963 | Hutty et al. | 239—201 |

M. HENSON WOOD, JR., *Primary Examiner.*

V. C. WILKS, *Assistant Examiner.*